June 6, 1967   E. R. BRASTOW ET AL   3,323,379
SPRING DRIVEN GYROSCOPE

Filed Nov. 23, 1964   5 Sheets-Sheet 1

INVENTORS.
EDGAR R. BRASTOW
ANDREW VOGE
WINSTON L. SKINNER
CLYDE R. AMSLER
RICHARD R. SCHABERG

BY
ATTORNEY.

June 6, 1967   E. R. BRASTOW ET AL   3,323,379
SPRING DRIVEN GYROSCOPE
Filed Nov. 23, 1964                 5 Sheets-Sheet 2

INVENTORS.
EDGAR R. BRASTOW
ANDREW VOGE
WINSTON L. SKINNER
CLYDE R. AMSLER
RICHARD R. SCHABERG
BY
ATTORNEY.

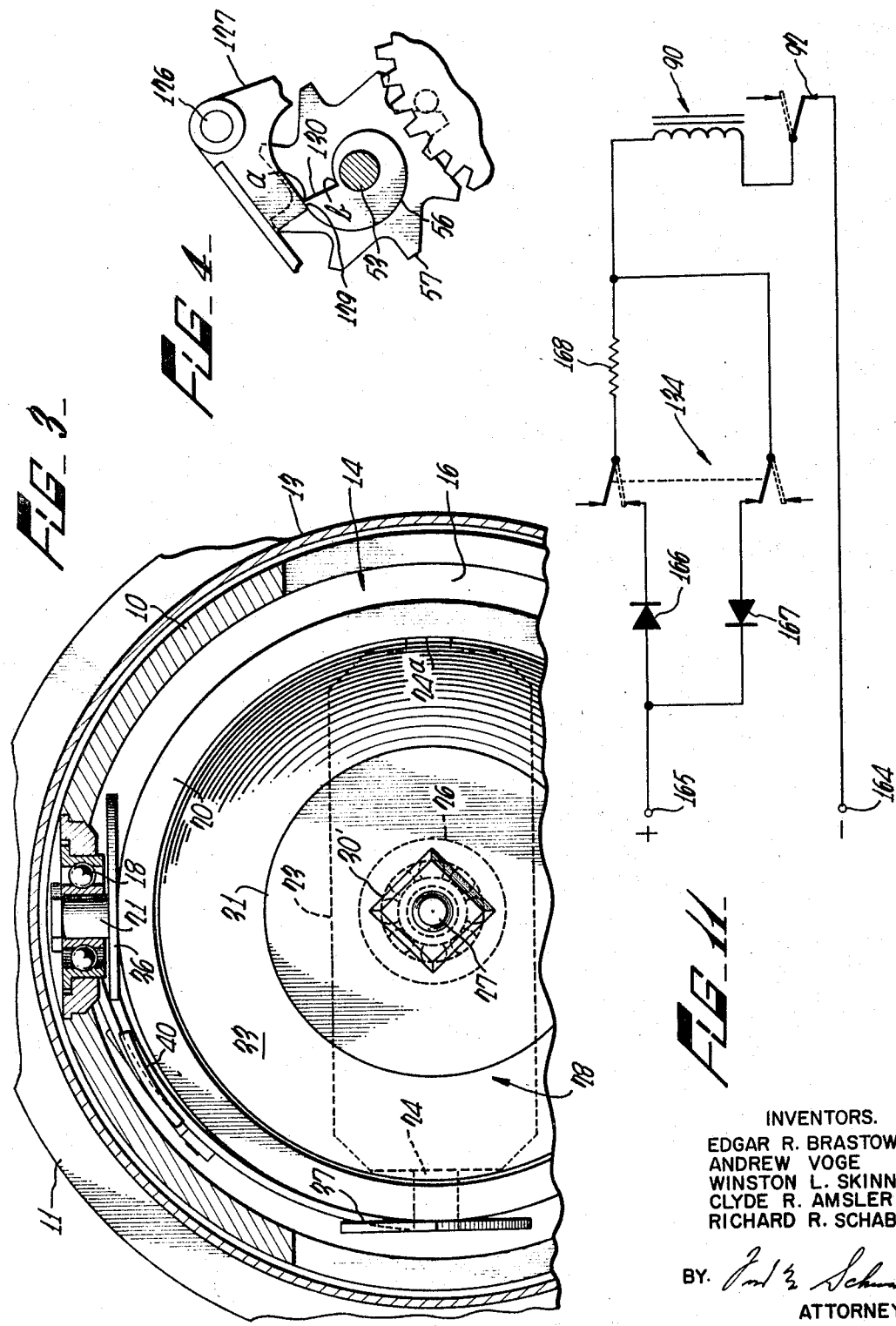

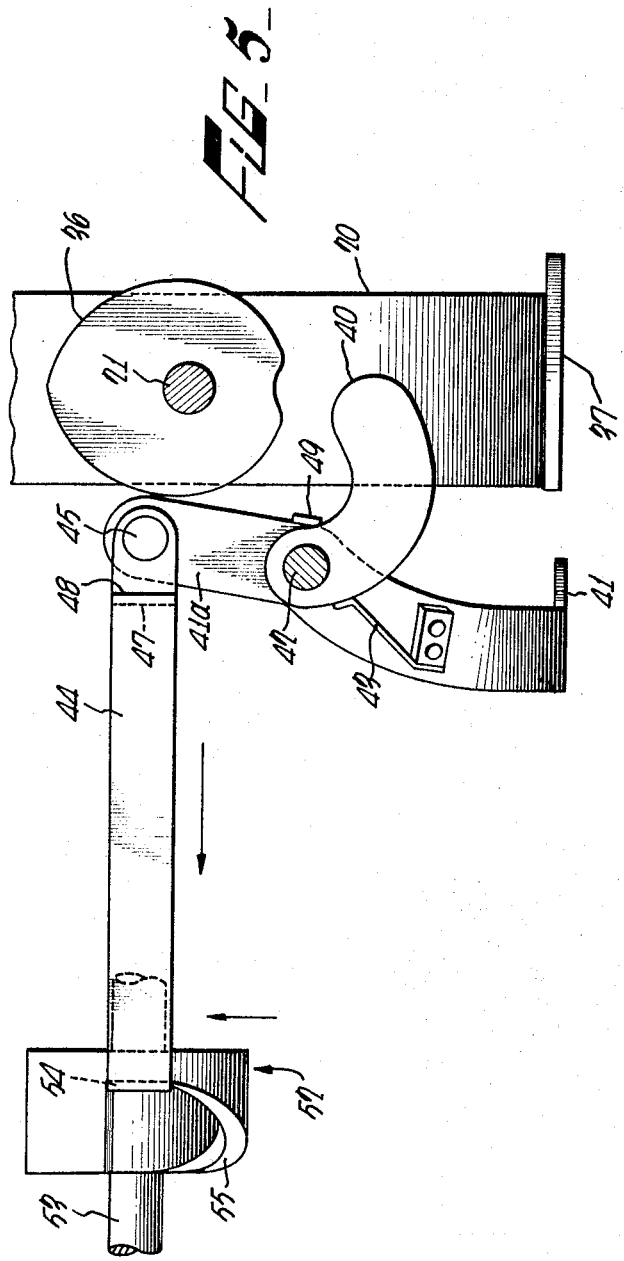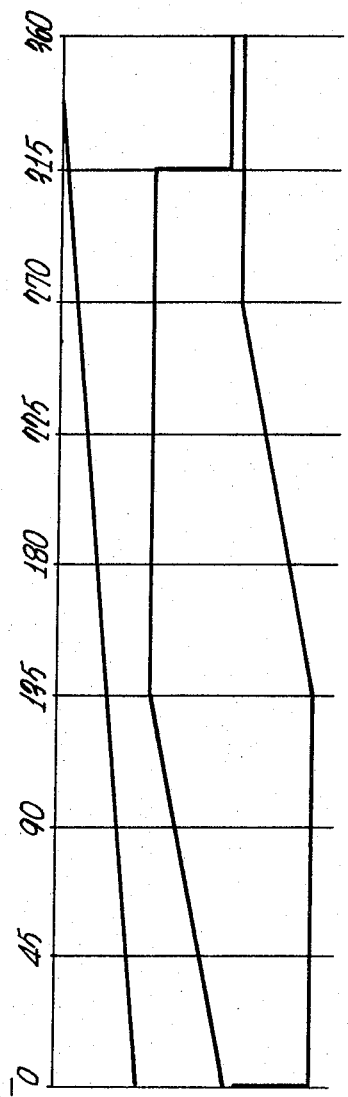

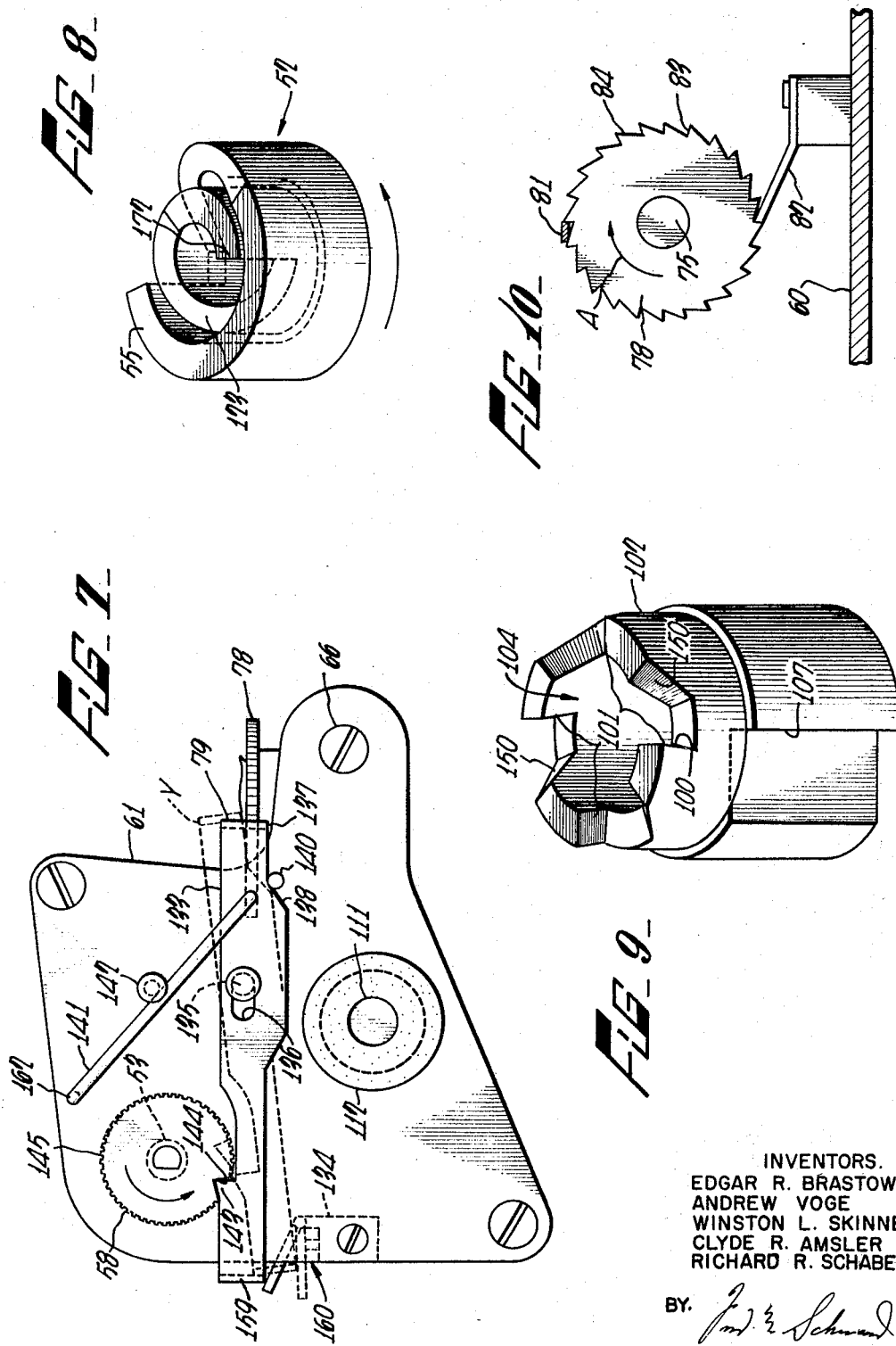

United States Patent Office 3,323,379
Patented June 6, 1967

3,323,379
SPRING DRIVEN GYROSCOPE
Edgar R. Brastow, Woodland Hills, Andrew Voge, Canoga Park, Winston L. Skinner, Woodland Hills, Clyde R. Amsler, Alhambra, and Richard R. Schaberg, Santa Monica, Calif., assignors to Clary Corporation, San Gabriel, Calif., a corporation of California
Filed Nov. 23, 1964, Ser. No. 413,083
14 Claims. (Cl. 74—5.14)

This invention relates to gyroscopes and has particular reference to spring driven gyroscopes applicable, for example, guided missiles, torpedoes, etc., wherein the gyro rotor must be brought up to operational speed in a very short time. In such applications, the rotor is brought up to speed by power derived from the spring and the rotor may then be allowed to spin freely or it may be maintained at operational speed by a small sustainer motor.

The drive spring for a gyroscope of the above type is generally wound after assembly and is left in such condition pending firing or testing. Also, such a gyroscope is generally provided with a two wire electric control circuit. Thus, when the missile is fired, or just prior to firing, a triggering pulse is applied to the release circuit to release the spring to operation.

In gyroscopes of the above type, it is highly desirable to test the gyroscope both after assembly and after installation in the missile. However, heretofore, such testing required at least partial dismantling of the gyroscope to rewind the spring and/or to cage the gyroscope gimbals, as well as partial dismantling of the missile in order to gain access to the gyroscope for the same purpose. This is undesirable not only because of the time and nuisance involved, but because of the possibility of dirt and other contaminants getting into the rotor bearings, etc, when the gyroscope and/or missile or the like is dismantled.

It therefore becomes a principal object of the present invention to remotely cage and rewind a spring driven gyroscope.

Another object is to utilize the same electric control circuit as is used for triggering release of a gyroscope drive spring for winding the spring, and for caging the gyroscope.

Another object is to utilize a two wire control circuit for both triggering the release of a gyroscope drive spring and for rewinding such spring.

Another object is to utilize a two wire control circuit for triggering release of a gyroscope drive spring and for recaging the gyroscope and rewinding the spring.

The maner in which the above and other objects of the invention are accomplished will be readily understood upon reference to the following specification when read in conjunction with the accompanying drawings, wherein:

FIG. 3 is a fragmentary sectional view taken along the line 3—3 of FIG. 2.

FIG. 4 is a fragmentary view taken along the line 4—4 of FIG. 2.

FIG. 5 is a fragmentary sectional view taken substantially along the line 5—5 of FIG. 2, illustrating the initial caging mechanism.

FIG. 6 is a schematic timing graph illustrating particularly the relationship between the initial caging mechanism and the final caging mechanism.

FIG. 7 is a transverse view taken substantially along the line 7—7 of FIG. 2.

FIG. 8 is a perspective view of the caging and coupling control cam.

FIG. 9 is a perspective view of the spring arbor.

FIG. 10 is a fragmentary view taken along the line 10—10 of FIG. 1, illustrating the incremental advance mechanism for winding the rotor drive spring and for rotating the control cams.

FIG. 11 is a schematic view illustrating the control circuit for winding the spring and for subsequently releasing the same to bring the rotor up to speed.

Figure 2:
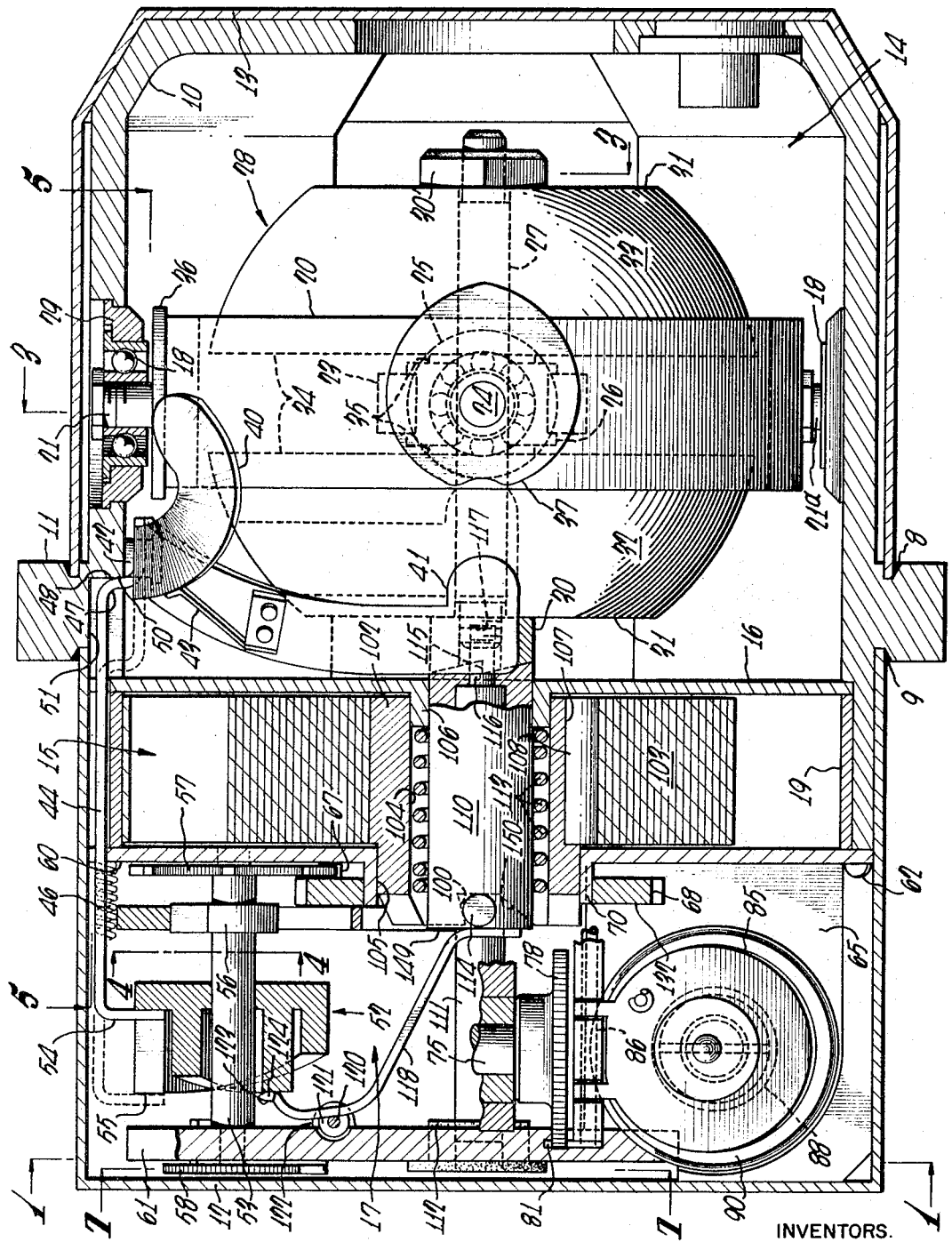
FIG. 2 is a longitudinal sectional view taken substantially along the line 2—2 of FIG. 1.

Referring to the drawings, and in particular to FIG. 2, the gyroscope comprises a casing 10 having an annular flange 11 which supports the enclosing end caps 12 and 13. The flange 11 is adapted to be attached to a suitable supporting structure and is preferably hermetically sealed to the end caps by applying solder or other sealing material around joints 8 and 9 so as to exclude entrance of dust and other contaminants from the operating parts of the gyroscope.

The casing 10 defines a rotor compartment 14 and a rotor spring compartment 15. These two compartments are separated from one another by a radially inwardly extending wall 16 held in place by a sleeve 19.

A third compartment 17 containing various control elements is defined primarily by the end cap 12 and a third wall 60 which is secured to the casing 10 by screws 62 and which also retains the sleeve 19 in place.

The rotor and gimbal assembly located in compartment 14 comprises a pair of diametrically opposed and axially aligned ball bearings 18 (FIGS. 2 and 3), each mounted within a bearing retainer 29 fitted within an opening in the casing 10. Such bearings rotatably support trunnion shaft sections 21 and 21a of an annular outer gimbal member 20.

An inner gimbal member 23 is provided with trunnion shaft sections 24 and 24a which are rotatably mounted in ball bearings, one of which is shown at 25, carried by the outer gimbal member 20.

A gyro rotor 28 comprised of two generally hemispherical sections 32 and 33 is mounted on the inner gimbal member 23. The sections 32 and 33 are located on opposite sides of the inner gimbal member and are secured to a rotor shaft 27 which is rotatably supported by the inner gimbal member 23 through ball bearings 26. The spin axis about which the shaft 27 and rotor 28 revolve, extends normal to the mutually perpendicular axes of movement of the inner and outer gimbal members. Thus, the gyroscope has three degrees of freedom.

A primary or initial caging mechanism is provided for positioning the outer and inner gimbal members 20 and 23 within capture range of a final, precise caging mechanism.

Secured to one of the trunnions 21 of the outer gimbal member 20 and to one of the trunnions 24 of the inner gimbal member 23, are a pair of heart cams 36 and 37, respectively (FIGS. 2 and 5). Operatively associated with the cam 36 is a caging arm 40 freely pivoted on a stud 42 secured to the casing 10. Operatively associated with the cam 37 is a second caging arm 41 which is also pivoted on the stud 42 and is bent into a curve extending through 90 degrees so that its engaging portion extends substantially in the same plane as cam 37. The arm 41 has an extension 41a thereon pivotally connected at 45 to a link member 44. The arm 41 is normally held in its position shown in FIGS. 2 and 5, by a tension spring 46. A leaf spring 43 on arm 41 normally holds the caging arm 40 in its position shown where it bears against an ear 49 formed on the arm 41. In such position of the arms, their cam engaging portions are located out of the paths of the associated cams.

It will be noted that the link 44 is guided for lengthwise movement in a recess 51 formed in the casing 10. Also, the outer end of the link 44 is bent to form a cam follower tab 54 which cooperates with the outer cylindrical end cam surface 55 of a cam 52 (FIG. 8).

Figure 1:
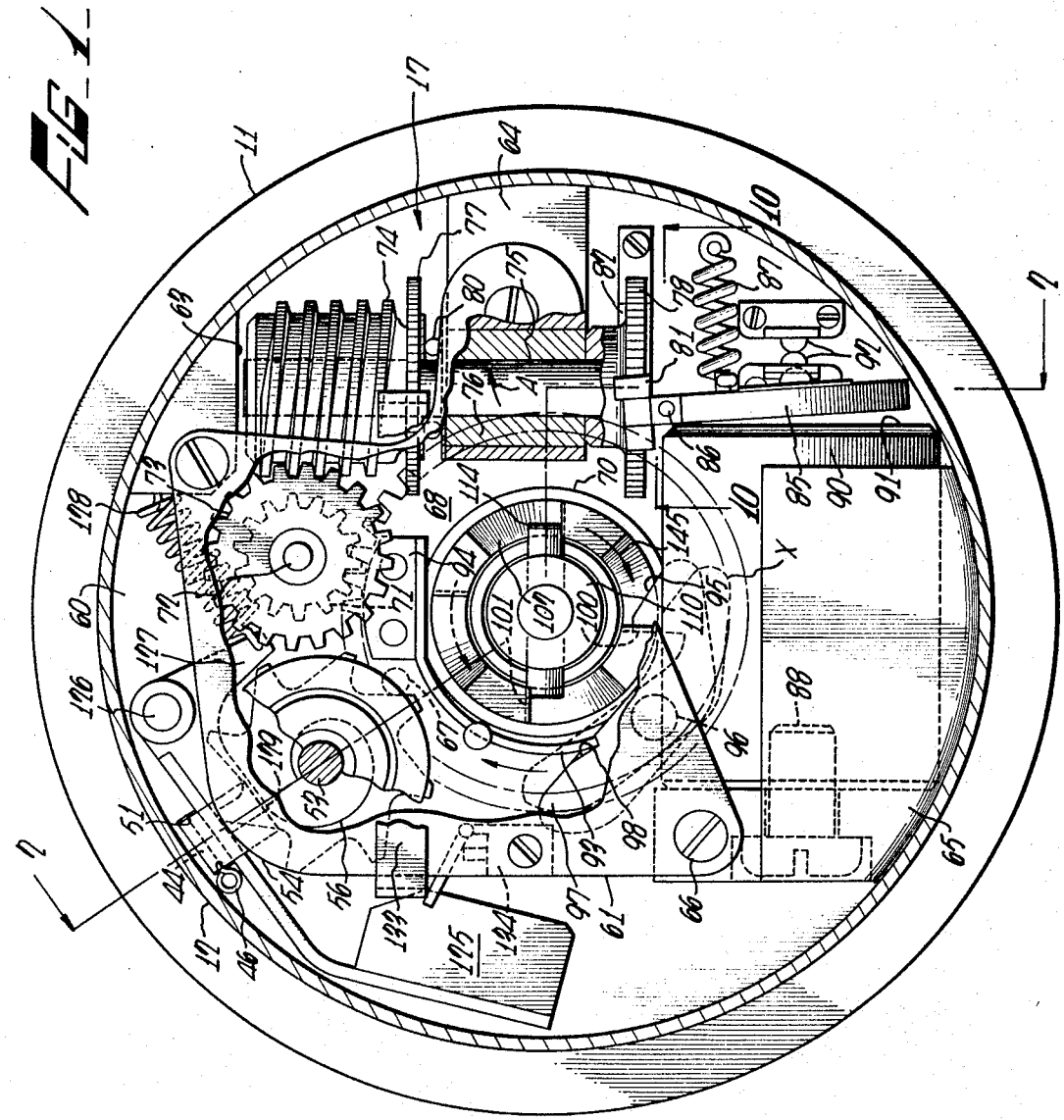
FIG. 1 is a transverse sectional view through a spring wound gyroscope embodying a preferred form of the present invention, such figure being taken substantially along the line 1—1 of FIG. 2.

The cam 52 (see also FIG. 2) is suitably secured to a shaft 53 which also supports a snail cam 56, an eight toothed ratchet wheel 57 and a second fine toothed ratchet wheel 58 (see also FIGS. 1 and 7). The shaft 53 is rotatably mounted at one end in a bearing formed in the wall 60 and at its other end in a frame plate 61. The plate 61 is supported on bosses 63, 64 and 65 (FIG. 1) extending outward from the wall 60, screws 66 being provided to removably secure the plate member in place.

The shaft 53 and elements 52, 56, 57 and 58 mounted thereon are incrementally advanced ⅛ of a turn at a time by a pin 67 which is mounted on a gear 68 rotatably supported on a hub 70 extending outwardly from the wall 60.

As shown in FIG. 1, the gear 68 meshes with a smaller gear 71 rotatably supported on a stud 72 and secured to a worm wheel 73. The latter meshes with a worm 74 secured on a shaft 75 which is rotatably supported in a bearing bushing 76. The latter is suitably secured to the boss 64.

Also secured to the shaft 75 are a pair of ratchet wheels 77 and 78 (see also FIG. 10), the teeth of wheel 77 extending in a direction opposite those of wheel 78. A thrust ball bearing 80 is located between the bearing bushing 76 and the ratchet wheel 77 to absorb thrust imposed by the worm 74.

Means are provided for incrementally rotating the shaft 75, and for this purpose a spring pawl 81 is carried by an armature 85 which is pivotally supported at 86 and cooperates with an electromagnet 90 secured to the boss 65 by a clamp screw 88.

A back-up preventing pawl 82 in the form of a leaf spring is supported from the wall 60 and engages the ratchet wheel 78 to prevent retrograde movement of the shaft 75.

The electromagnet device 90 is self-pulsating to incrementally rotate the shaft 75 so as to rotate the gear 68 in a clockwise director (as viewed from FIG. 1) when current is applied to the magnet. For this purpose, the coil of the magnet 90 is connected in series with a pair of switch contacts 92 (see also FIG. 11), one of which is carried by the armature 85 and the other is supported in fixed position relative to the wall 60.

The gear 68 is effective to wind a torsion type rotor drive spring 103 (FIG. 2) for bringing the rotor up to operational speed and for this purpose, a pawl 95 is pivoted at 96 on the gear 68. The pawl is urged into a position in engagement with one of four equally spaced teeth 101 on a spring arbor 102 (see also FIG. 9) by a leaf spring member 93 which is mounted at 94 on the gear 68.

The arbor 102 has a cylindrical bore 104 (FIG. 2) therethrough and is rotatably supported within the inside diameter of the hub 70 of wall 60 at one end and is supported at its opposite end on the outside diameter of a hub 106 forming part of the wall 16. The arbor is notched at 107 to receive a curled portion 108 formed on the inner end of the drive spring 103, thereby enabling the arbor to wind the drive spring and, when properly released to enable the spring to rotate the arbor. The drive spring is suitably attached at its outer end to the casing 109 through the sleeve 19.

A combined caging and drive shaft 110 is rotatably and slideably mounted at one end in the hub 106 and at its opposite end in a bearing bushing 112 supported by the plate 61.

The shaft 110 is urged to the left in FIG. 2 by a compression spring 113 extending between the hub 106 and a pin 114 projecting transversely through the shaft 110. When the shaft 110 is in its righthand or caging position, shown in FIG. 2, the pin 114 engages behind two of the arbor teeth 101 whose shoulders 100 are undercut slightly to aid in maintaining the shaft 110 in its illustrated position during the unwinding operation.

The caging shaft 110 extends into the rotor compartment 14 and has a shouldered end 115 which is engageable with a similar mating end formed on a nut 30 attached to the rotor shaft 27. Also, a caging pin 116, extending integrally from the shaft 110 normally fits within an axial recess 117 in the rotor shaft 27 to precisely cage the rotor.

The caging shaft 110 is normally held in its illustrated caged and rotor driving position by a cam follower member 118 which is pivotally supported at 120 on the plate 61 and has a cam follower portion 124 which rides on an inner cam surface 123 formed on the cam 52. The outer end of the cam follower 118 rides against a shouldered end face 149 of the shaft 110.

Means are provided for releasing the pawl 95 to enable the spring 103 to effect rotation of the rotor through the arbor 102, pin 114 and shaft 110. For this purpose, a trip hammer 125 (FIG. 1), located in the same plane as the pawl 95, is pivotally supported at 126 on the wall 60 and is tensioned counterclockwise by a spring 128 extending between an extension 127 of the hammer and the boss 63. The hammer 125 is normally held in its illustrated energized position by the aforementioned snail cam 56 which bears against a shoulder 129 on the hammer. Thus, as the snail cam 56 is rotated counterclockwise beyond its position shown in FIGS. 1 and 2, it will release the hammer 125, permitting the same to strike the tail 97 of pawl 95 thereby forcing the latter into the dotted line position X, out of engagement with the cooperating tooth 100 on the spring arbor 102.

As shown in FIG. 7 a pawl 133 is provided having a slot 136 embracing a stud 135 on the frame plate 61, thus permitting the pawl to both rock between its illustrated full and dotted line positions and to move a limited amount in a longitudinal direction. The pawl has a downwardly extending ear 79 at one end engageable with the aforementioned ratchet wheel 78 and an ear 159 at its opposite end which engages a double pole, double throw switch 134 (see also FIG. 11).

A spring wire 141 is attached at one end 162 to the plate 61 and at its opposite end to the pawl 133. The spring presses against a frame stud 142 at its mid portion, causing it to urge the pawl 133 to the left and into a clockwise rocked position, shown in full lines, wherein a pawling shoulder 143 thereon engages in a notch 144 in the aforementioned ratchet wheel 58, thereby enabling switch 134 to assume its position shown in FIG. 11. With the pawling shoulder 143 engaged in notch 144, pawl 133 by-passes the gear train, providing a direct drive for fast rotation of snail cam 56 to effect fast release of the drive spring 103.

Describing now the control circuit for the gyroscope, the aforementioned switch contacts 92 are directly connected to one of a pair of D.C. current supply terminals 164 and 165. The other terminal of such pair is connected to two diodes 166 and 167 arranged in reverse order. The diode 166 is connected to a contact of an upper pole of the switch 134 and the diode 167 is connected to a contact of the lower pole of switch 134. The upper pole is connected to the coil of the electromagnet 90 through a voltage dropping resistor 168.

*Operation (release and uncaging)*

The drawings illustrate the gyroscope in an energized condition, ready for operation. In such condition, the spring 103 is wound, the shaft 110 is in driving engagement with the rotor, the caging pin 116 is in caging engagement and the primary caging mechanism, including caging arms 40 and 41, FIG. 5, is relaxed or ineffective. Also, in this condition, the shaft 53 is located as illustrated with the high point of the snail cam 56 (FIG. 4) holding the hammer 125 in its outermost position and the notch 144 of the ratchet wheel 58 is located in register with the pawling shoulder 143 of pawl 133 whereby the switch 134 will be held in its position shown in FIG. 11.

Now, upon application of a firing or releasing pulse of suitable duration across the terminals 164 and 165, with a polarity opposite that indicated in FIG. 11, a circuit will be completed through diode 167, the lower pole of switch 134, and the coil and contacts of electromagnet device 90 to incrementally rotate the shaft 75 and worm 74 one or more steps. Since the pawling shoulder 143 of pawl 133 (FIG. 7) is now engaged with the notch 144 in ratchet wheel 58, it will be drawn to the right causing its pawling shoulder 143 to advance the ratchet wheel 58 and the shaft 53 counterclockwise. After one or more operations of the magnet 90, the snail cam 56 will pass from under the shoulder 131 on hammer 125, enabling the latter to be swung into engagement with the pawl 95 to release the same from the spring arbor 102. The spring 103 will now become effective to quickly rotate the arbor and the teeth 101 of the latter will, through pin 114, rotate the shaft 110 and consequently the rotor 28, bringing the latter quickly up to speed.

During the aforementioned rotation of the shaft 53, the cam follower 118 will drop off a high portion 172 (FIG. 8) of the cam surface 123 of cam 57, but the undercut edge 100 of the engaging arbor teeth 101 will continue to hold the shaft 110 against the action of spring 113 until the force of spring 103 becomes spent. As the speed of rotation of the arbor 102 by the spring 103 drops below the speed of the rotor, the pin 114 will be removed from the shoulders 100 and will tend to ride up camming surfaces 150 (FIG. 9) formed on the teeth 101 to aid the spring 113 in withdrawing the shaft 110 to the left. Thus, the shoulder 115 of the latter will become uncoupled from the rotor and shortly thereafter the caging pin 116 will be withdrawn, leaving the rotor free and uncaged.

During the rightward movement of the pawl 133 to effect release of the spring 103 into operation, an inclined edge 38 thereon will engage a fixed pin 140 causing the pawl to rock counterclockwise about stud 135 until it disengages from the ratchet wheel 78. The spring 141 now returns the pawl to the right, causing the pawling shoulder 143 to ride up the following edge of the notch 144 and as it approaches the periphery of the ratchet wheel, the pawl will throw the switch 134 to its alternate position, connecting the diode 166 in circuit with the resistor 168 and electromagnet 90. Thus, the firing signal will be rendered ineffective even if it should be prolonged.

*Operation (rewind and caging)*

After a testing operation or whenever it is desired to wind the drive spring and prepare the gyroscope for operation, a signal having the polarity indicated in FIG. 11 is applied to the terminals 164 and 165, completing a circuit through diode 166, the upper pole of switch 134, resistor 168 and the electromagnet 90. This will be a prolonged signal, causing the electromagnet 90 to pulsate, whereby to incrementally advance the shaft 75 and entrained gears. As the gear 68 rotates, the pin 67 thereon will engage the ratchet 57 and thus advance the shaft 53 counterclockwise 1/8 of a revolution as an incident to each revolution of the gear 68.

During such rotation of the gear 68, the pawl 95 will be in engagement with one of the teeth 101 of the spring arbor 102, enabling the latter to wind the spring 103 into energized condition. At the same time, the cam 52 will first cam the primary caging mechanism shown in FIG. 5 to sequentially cage first the outer gimbal member and thereafter the inner gimbal member. Upon completion of such caging operation, cam 52 will actuate cam follower 118 to force the caging shaft 110 to the right toward coupling engagement with the rotor and, at the same time, the caging pin 116 will move into caging engagement with the recess 117 in the rotor shaft. Thereafter, as will be noted in reference to FIG. 6, the link 44 will drop from the high portion of camming surface 55, permitting spring 46 to withdraw the primary caging arms 40 and 41.

Upon completion of a revolution of the shaft 53 as an incident to eight revolutions of the drive gear 68, the notch 144, FIG. 7, of ratchet wheel 58 again registers with the pawling shoulder 143 of the pawl 133, allowing the pawl to be rocked clockwise into its illustrated full line position by the spring 141, thus allowing the switch 134 to return to its position shown in FIG. 11 and thus terminate the winding operation, even through the energizing signal may remain effective.

Although the invention has been described in detail and certain specific terms and languages have been used, it is to be understood that the present disclosure is illustrative rather than restrictive and that changes and modifications can be made without departing from the spirit or scope of the invention as set forth in the claims appended hereto.

Having thus described the invention, what is desired to be secured by United States Letters Patent is:

1. A gyroscope comprising a rotor,
  means supporting said rotor for rotation about a spin axis and for movement about at least one axis perpendicular to said spin axis,
  means including a spring for rotating said rotor;
  means for energizing said spring,
  means for holding said spring in energized condition,
  and means operable by said energizing means for releasing said holding means.

2. A gyroscope comprising a rotor,
  means supporting said rotor for rotation about a spin axis and for movement about at least one axis perpendicular to said spin axis,
  means including a spring for rotating said rotor;
  means for energizing said spring a predetermined amount,
  means for holding said spring in energized condition,
  and means operable by said energizing means upon energizing said spring beyond said predetermined amount for releasing said holding means.

3. A gyroscope comprising a rotor,
  means supporting said rotor for rotation about a spin axis and for movement about at least one axis perpendicular to said spin axis,
  means including a spring for spinning said rotor;
  means for energizing said spring,
  means for disabling said energizing means upon a predetermined energization of said spring,
  means for holding said spring in energized condition,
  means for re-enabling said energizing means,
  and means responsive to said energizing means upon re-enablement thereof for releasing said holding means.

4. A gyroscope comprising a rotor having a first coupling part,
  means supporting said rotor for rotation about a spin axis and for movement about at least one axis perpendicular to said spin axis,
  drive means for said rotor including a second coupling part engageable with said first coupling part;
  a spring for actuating said drive means,
  means for energizing said spring a predetermined amount,
  means controlled by said energizing means for coupling said coupling parts during said energization of said spring,
  means for latching said spring in energized condition, and
  means operable by said energizing means upon energizing said spring beyond said predetermined amount for releasing said latch means.

5. A gyroscope according to claim 4 comprising means responsive to rotation of said rotor by said drive means for uncoupling said coupling parts.

6. A gyroscope comprising a rotor having a first coupling part,
means supporting said rotor for rotation about a spin axis and for movement about at least one axis perpendicular to said spin axis,
drive means for said rotor including a second coupling part engageable with said first coupling part;
a spring for actuating said drive means,
means for energizing said spring a predetermined amount,
means operable by said energizing means as an incident to said energization of said spring for coupling said coupling parts,
means for holding said spring in energized condition,
means operable by said energizing means upon energizing said spring beyond said predetermined amount for releasing said holding means, and
means operable as an incident to actuation of said drive means by said spring for uncoupling said coupling parts.

7. A gyroscope comprising a rotor having a first coupling part,
means supporting said rotor for rotation about a spin axis and for movement about at least one axis perpendicular to said spin axis,
drive means for said rotor including a second coupling part engageable with said first coupling part;
a spring for actuating said drive means,
means for energizing said spring,
means operable by said energizing means for coupling said coupling parts,
means for disabling said energizing means upon a predetermined energization of said spring by said energizing means,
means for holding said spring in energized condition,
means for re-enabling said energizing means,
means responsive to said energizing means upon re-enablement thereof for releasing said holding means, and means responsive to actuation of said drive means by said spring for uncoupling said coupling parts.

8. A gyroscope comprising a rotor,
means supporting said rotor for rotation about a spin axis and for movement about mutually perpendicular axes,
drive means for said rotor,
a spring for actuating said drive means,
means for energizing said spring a predetermined amount,
means operable by said energizing means upon said energization of said spring for caging said rotor supporting means,
means for latching said spring in said energized condition,
means operable by said energizing means upon energizing said spring beyond said predetermined amount for releasing said latch means, and
means responsive to rotation of said rotor by said drive means for uncaging said rotor supporting means.

9. A gyroscope comprising a rotor having a first coupling part,
means supporting said rotor for rotation about a spin axis and for movement about mutually perpendicular axes,
drive means for said rotor including a second coupling part engageable with said first coupling part;
a spring for actuating said drive means,
means for energizing said spring a predetermined amount,
means operable by said energizing means upon said energization of said spring for caging said rotor supporting means and for coupling said coupling parts,
means for latching said spring in energized condition,
means controlled by said energizing means upon energizing said spring beyond said predetermined amount for releasing said latch means, and
means responsive to driving of said drive means by said spring for uncaging said caging means and for uncoupling said coupling parts.

10. A gyroscope comprising a rotor,
means supporting said rotor for rotation about a spin axis and for movement about at least one axis perpendicular to said spin axis,
drive means including a spring for rotating said rotor,
latch means for normally preventing rotation of said rotor by said spring,
means for energizing said spring,
electromagnetic means including an operating circuit for operating said energizing means;
a first normally closed switch in said circuit,
a second normally open switch in said circuit connected in parallel with said first switch,
means operable by said energizing means for opening said first switch and closing said second switch upon energization of said spring a predetermined amount, unidirectional current limiting devices in series with respective ones of said switches and in opposite current limiting relation to each other, and
means responsive to energization of said spring beyond said predetermined amount for releasing said latch means whereby application of a direct current to said circuit in one direction will energize said electromagnetic means when one of said switches is closed and application of a direct current to said circuit in the opposite direction will energize said electromagnetic means when the other of said switches is closed.

11. A gyroscope comprising a rotor,
a base,
gimbal means pivotally supported by said base for movement about at least one axis, means on said gimbal means supporting said rotor for rotation about a spin axis perpendicular to said first mentioned axis,
drive means including a spring for rotating said rotor,
means for energizing said spring a predetermined amount, means for latching said spring in energized condition,
a primary caging means operable by said energizing means during said energization of said spring to turn said gimbal means to a predetermined position relative to said base,
final caging means operable to maintain said gimbal means in said predetermined position,
means operable by said energizing means during energization of said spring for rendering said primary caging means effective,
means for rendering said final caging means effective only after said primary caging means has moved said gimbal means to said predetermined position, and
means operable by said energizing means upon energizing said spring beyond said predetermined amount for releasing said latch means and for rendering said primary caging means ineffective.

12. A gyroscope comprising a rotor,
power means for rotating said rotor,
a base,
gimbal means pivotally supported by said base for rotatably supporting said rotor,
primary caging means for turning said gimbal means to a predetermined position relative to said base,
final caging means operable to maintain said gimbal means in said predetermined position,
a control member movable through a predetermined path,
means controlled by said control member during the first portion of its movement for rendering said primary caging means effective,
means controlled by said control member during a second portion of its movement for rendering said final caging means effective and said primary caging means ineffective, and means controlled by said control member during a third portion of its movement for enabling said power means and for disabling said final caging means.

13. A gyroscope comprising a rotor,
means including a spring for rotating said rotor;
a base,
gimbal means pivotally supported by said base for rotatably supporting said rotor,
primary caging means for turning said gimbal means to a predetermined position relative to said base,
final caging means operable to maintain said gimbal means in said predetermined position,
means including a control member movable through a predetermined path,
means controlled by said control member during a first portion of its movement for energizing said spring and for rendering said primary caging means effective,
means for holding said spring in energized condition,
means controlled by said control member during a second portion of its movement for further energizing said spring and for rendering said final caging means effective and said primary caging means ineffective, and
means controlled by said control member during a third portion of its movement for disabling said final caging means and for releasing said holding means.

14. A gyroscope according to claim 13 comprising means for arresting said control member after movement thereof through said second portion of its movement and means for thereafter initiating movement of said control member through said third portion of its movement.

References Cited

UNITED STATES PATENTS

| | | | |
|---|---|---|---|
| 2,383,663 | 8/1945 | MacCallum et al. | 74—5.1 |
| 2,732,721 | 1/1956 | Summers | 74—5.12 |
| 2,911,832 | 11/1959 | Thierman | 74—5.12 |
| 2,962,901 | 12/1960 | Shirley | 74—5.1 |

FRED C. MATTERN, JR., *Primary Examiner.*

J. D. PUFFER, *Assistant Examiner.*